(12) United States Patent
Nakagawa et al.

(10) Patent No.: US 10,108,044 B2
(45) Date of Patent: Oct. 23, 2018

(54) LIQUID CRYSTAL DISPLAY DEVICE

(71) Applicant: Panasonic Liquid Crystal Display Co., Ltd., Himeji-shi, Hyogo (JP)

(72) Inventors: Teruhisa Nakagawa, Hyogo (JP); Daisuke Kajita, Hyogo (JP); Tsuyoshi Uchida, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 45 days.

(21) Appl. No.: 15/459,930

(22) Filed: Mar. 15, 2017

(65) Prior Publication Data

US 2017/0269425 A1 Sep. 21, 2017

(30) Foreign Application Priority Data

Mar. 16, 2016 (JP) .................................. 2016-052683

(51) Int. Cl.
| | | |
|---|---|---|
| G02F 1/1362 | (2006.01) | |
| G02F 1/1335 | (2006.01) | |
| G02F 1/1333 | (2006.01) | |
| G02F 1/1343 | (2006.01) | |

(52) U.S. Cl.
CPC .. *G02F 1/133514* (2013.01); *G02F 1/133345* (2013.01); *G02F 1/133512* (2013.01); *G02F 1/134309* (2013.01); *G02F 1/136286* (2013.01); *G02F 2001/134372* (2013.01); *G02F 2001/136295* (2013.01); *G02F 2201/121* (2013.01); *G02F 2201/123* (2013.01)

(58) Field of Classification Search
CPC ................................................. G02F 1/136286
See application file for complete search history.

(56) References Cited

U.S. PATENT DOCUMENTS

| | | |
|---|---|---|
| 2008/0186440 A1 | 8/2008 | Lim et al. |
| 2010/0171892 A1 | 7/2010 | Lim et al. |
| 2017/0242308 A1* | 8/2017 | Seki ..................... G02F 1/13338 |

FOREIGN PATENT DOCUMENTS

| | | |
|---|---|---|
| JP | 2008-191669 | 8/2008 |
| JP | 2010102205 A * | 5/2010 |

* cited by examiner

*Primary Examiner* — Nathanael R Briggs
*Assistant Examiner* — Alexander Gross
(74) *Attorney, Agent, or Firm* — Hamre, Schumann, Mueller & Larson, P.C.

(57) ABSTRACT

A liquid crystal display device includes a first substrate, a second substrate, and a liquid crystal layer. The first substrate includes first wirings extending in a first direction, second wirings extending in a second direction, third wirings extending in the first direction. A center position of a width in the second direction of the third wiring disposed at boundary between blue and red pixels is displaced to a red pixel side from a center position of a width in the second direction of the first wiring disposed at boundary between the blue and red pixels. A center position of a width in the second direction of the third wiring disposed at boundary between the red and green pixels is displaced to the red pixel side from a center position of a width in the second direction of the first wiring disposed at the boundary between the red and green pixels.

17 Claims, 11 Drawing Sheets

LIQUID CRYSTAL DISPLAY DEVICE

CROSS-REFERENCE TO RELATED APPLICATION

The present application claims priority from Japanese application JP 2016-052683 filed on Mar. 16, 2016, the content of which is hereby incorporated by reference into this application.

TECHNICAL FIELD

This disclosure relates to a liquid crystal display device.

BACKGROUND

The liquid crystal display device includes a thin film transistor substrate (hereinafter, referred to as a TFT substrate), a color filter substrate (hereinafter, referred to as a CF substrate) disposed opposite to the TFT substrate, and a liquid crystal layer sandwiched between the TFT substrate and the CF substrate. In a lateral electric field type liquid crystal display device in various liquid crystal display devices, a pixel electrode and a common electrode are formed on a TFT substrate, and colored portions (for example, a red portion, a green portion, and a blue portion) transmitting light beams in different colors (for example, red, green, and blue) and a light shielding portion (hereinafter, referred to as a black matrix) disposed at a boundary between the colored portions are formed on a CF substrate. Conventionally, in the lateral electric field type liquid crystal display device, there is proposed a configuration in which a common electrode wiring (also referred to as a common wiring) made of metal such as Cu is formed along an extending direction of a data line on the common electrode so as to overlap the data line in planar view (for example, see PTL 1).

However, in the configuration of PTL 1, backlight radiated on a blue pixel and a green pixel, which are adjacent to a red pixel, is reflected from a common electrode wiring disposed at the boundary between the blue pixel and the red pixel or a common electrode wiring disposed at the boundary between the red pixel and the green pixel, and the reflected light is again reflected from the data line disposed at the boundary between the blue pixel and the red pixel or the data line disposed at the boundary between the red pixel and the green pixel. In the case where the common electrode wiring and the data line is formed by a metallic wiring containing copper Cu, because the light beams reflected from the common electrode wiring and data line include red color as a main component, finally the reflected light is transmitted through the red portion corresponding to the red pixel and exits outward from the CF substrate. Therefore, a transmission light amount of each colored portion becomes uneven, and display unevenness is visually recognized.

SUMMARY

The present disclosure has been made in view of the above problems, and an object thereof is to provide a liquid crystal display device that can reduce display unevenness caused by backlight reflected from a signal wiring.

In one general aspect, the instant application describes a liquid crystal display device including a first substrate, a second substrate disposed opposite to the first substrate, and a liquid crystal layer sandwiched between the first substrate and the second substrate. The first substrate includes a plurality of first wirings extending in a first direction, a plurality of second wirings extending in a second direction different from the first direction, a plurality of third wirings that extend in the first direction and at least partially overlaps the first wiring, a plurality of pixel electrodes, a common electrode disposed opposite to the plurality of pixel electrodes, and a plurality of pixels disposed in the first direction and the second direction. The second substrate includes a blue portion transmitting blue light, a red portion transmitting red light, a green portion transmitting green light, and a light shielding portion disposed at each boundary of the blue portion, the red portion, and the green portion to block the light transmission of each color. The plurality of pixels include a blue pixel corresponding to the blue portion, a red pixel corresponding to the red portion, and a green pixel corresponding to the green portion, the plurality of third wirings are formed closer to the liquid crystal layer than the plurality of first wirings are. A center position of a width in the second direction of the third wiring disposed at the boundary between the blue pixel and the red pixel is displaced to a red pixel side from a center position of a width in the second direction of the first wiring disposed at the boundary between the blue pixel and the red pixel, and a center position of a width in the second direction of the third wiring disposed at the boundary between the red pixel and the green pixel is displaced to the red pixel side from a center position of a width in the second direction of the first wiring disposed at the boundary between the red pixel and the green pixel.

The above general aspect may include one or more of the following features. A displacement amount between the center position of the width in the second direction of the third wiring disposed at the boundary between the red pixel and the green pixel and the center position of the width in the second direction of the first wiring disposed at the boundary between the red pixel and the green pixel may be larger than a displacement amount between the center position of the width in the second direction of the third wiring disposed at the boundary between the blue pixel and the green pixel and the center position of the width in the second direction of the first wiring disposed at the boundary between the blue pixel and the green pixel.

The plurality of first wirings and the plurality of third wirings may be made of a metallic material containing copper.

The first wiring may be a data line, the second wiring may be a gate line, and the third wiring may be a common electrode wiring through which a common voltage is supplied to the common electrode.

The plurality of data lines may be arranged at equal intervals in the second direction.

The plurality of common electrode wirings may be arranged at equal intervals in the second direction. The center position of the width in the second direction of the data line disposed at the boundary between the blue pixel and the red pixel may be displaced to a blue pixel side from the center position of the width in the second direction of the common electrode wiring disposed at the boundary between the blue pixel and the red pixel, and the center position of the width in the second direction of the data line disposed at the boundary between the red pixel and the green pixel is displaced to a green pixel side from the center position of the width in the second direction of the common electrode wiring disposed at the boundary between the red pixel and the green pixel.

The light shielding portions extending in the first direction may be arranged at equal intervals in the second direction.

The center position of the width in the second direction of the common electrode wiring disposed at the boundary between the blue pixel and the red pixel may be displaced to the red pixel side from the center position of the width in the second direction of the light shielding portion disposed at the boundary between the blue portion and the red portion. The center position of the width in the second direction of the data line disposed at the boundary between the blue pixel and the red pixel may be displaced to the blue pixel side from the center position of the width in the second direction of the light shielding portion disposed at the boundary between the blue portion and the red portion. The center position of the width in the second direction of the common electrode wiring disposed at the boundary between the red pixel and the green pixel may be displaced to the red pixel side from the center position of the width in the second direction of the light shielding portion disposed at the boundary between the red portion and the green portion. And the center position of the width in the second direction of the data line disposed at the boundary between the red pixel and the green pixel may be displaced to the green pixel side from the center position of the width in the second direction of the light shielding portion disposed at the boundary between the red portion and the green portion.

The common electrode wiring disposed at the boundary between the blue pixel and the red pixel and the common electrode wiring disposed at the boundary between the red pixel and the green pixel blocks reflected light incident on the red portion, the reflected light including a red component caused by reflection of backlight from the plurality of data lines and the plurality of common electrode wirings.

The liquid crystal display device may further include an insulator covering the plurality of data lines. The common electrode may be formed on the insulator, and the plurality of common electrode wirings may be formed on the common electrode.

The first wiring may be a common electrode wiring through which a common voltage is supplied to the common electrode, the second wiring may be a gate line, and the third wiring is a data line.

The first wiring may be a gate line, the second wiring may be a data line, and the third wiring may a common electrode wiring through which a common voltage is supplied to the common electrode.

In another general aspect, the liquid crystal display device of the instant application includes a first substrate, a second substrate disposed opposite to the first substrate, and a liquid crystal layer sandwiched between the first substrate and the second substrate. The first substrate includes a plurality of first wirings extending in a first direction, a plurality of second wirings extending in a second direction different from the first direction, a plurality of third wirings that extend in the first direction and at least partially overlaps the first wiring, a plurality of pixel electrodes, a common electrode disposed opposite to the plurality of pixel electrodes, and a plurality of pixels disposed in the first direction and the second direction. The second substrate includes a blue portion transmitting blue light, a red portion transmitting red light, a green portion transmitting green light, and a light shielding portion disposed at each boundary of the blue portion, the red portion, and the green portion to block the light transmission of each color. The plurality of pixels include a blue pixel corresponding to the blue portion, a red pixel corresponding to the red portion, and a green pixel corresponding to the green portion. The plurality of first wirings and the plurality of third wirings are made of a metallic material containing copper. The plurality of third wirings are formed closer to the liquid crystal layer than the plurality of first wirings are. A first interval is equal to a second interval, the first interval being an interval between the two first wirings adjacent to each other with the red pixel therebetween, and the second interval being an interval between the two first wirings adjacent to each other with the blue pixel therebetween. A third interval is smaller than a fourth interval, the third interval being an interval between the two third wirings adjacent to each other with the red pixel therebetween, and the fourth interval being an interval between the two third wirings adjacent to each other with the blue pixel therebetween.

The above general aspect may include one or more of the following features. The first wiring may be a data line, the second wiring may be a gate line, and the third wiring may be a common electrode wiring through which a common voltage is supplied to the common electrode.

The light shielding portions extending in the first direction may be equally arranged at fifth intervals in the second direction.

The fifth interval may be equal to the first interval, and may be larger than the third interval.

The fifth interval may be smaller than the first interval, and may be equal to the third interval.

The fifth interval may be smaller than the first interval, and may be larger than the third interval.

In the liquid crystal display device according to the present disclosure, the display unevenness caused by the backlight reflected from the signal wiring can be reduced.

DETAILED DESCRIPTION

Figure 1:
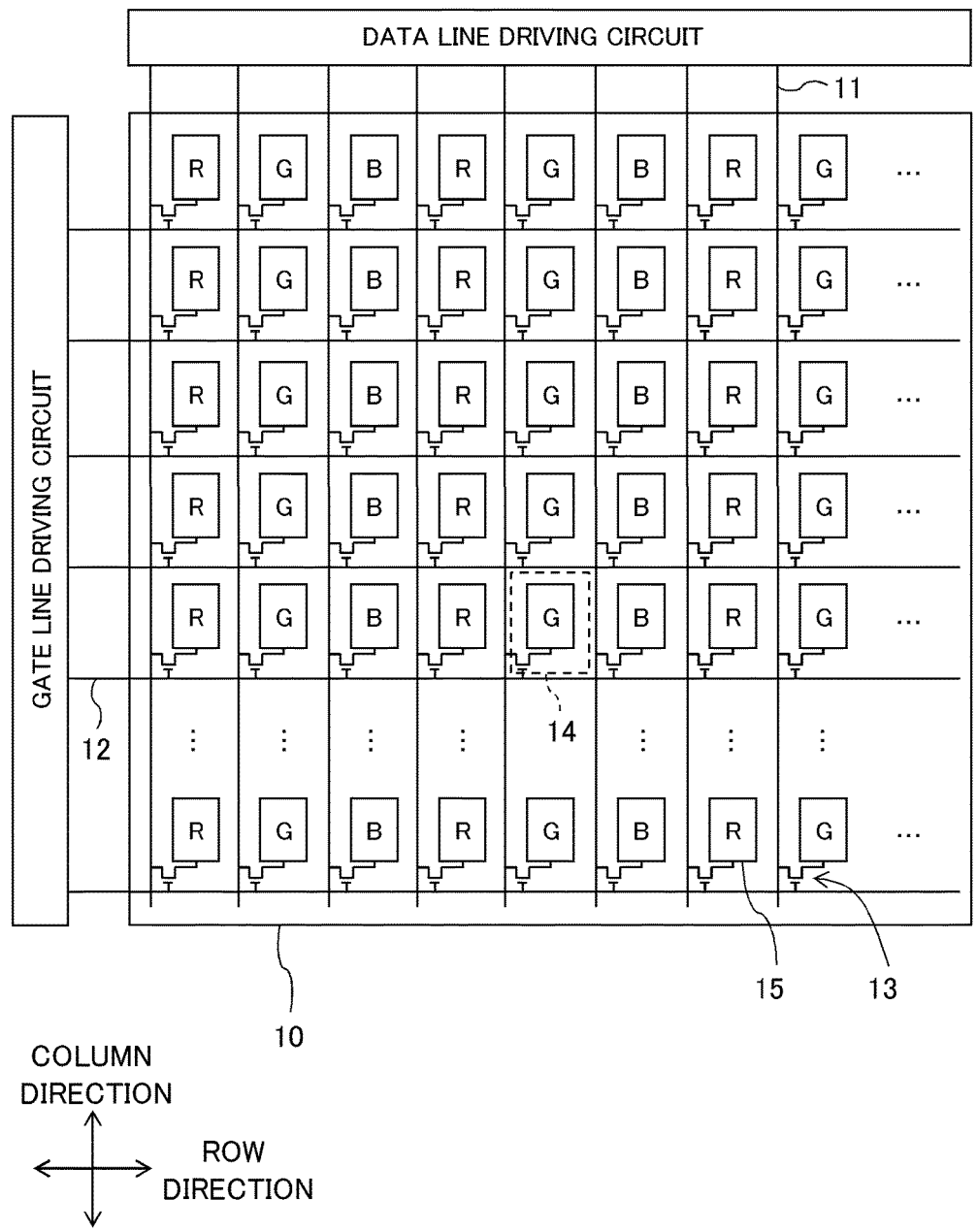
FIG. 1 is a plan view illustrating an entire configuration of a liquid crystal display device according to an exemplary embodiment.

FIG. 1 is a plan view illustrating an entire configuration of a liquid crystal display device according to an exemplary embodiment. Liquid crystal display device 1 includes display panel 10 that displays an image, a driving circuit (data line driving circuit, gate line driving circuit) that drives display panel 10, a control circuit (not illustrated) that controls the driving circuit, and a backlight (not illustrated) that irradiates display panel 10 with light from a rear surface side. The driving circuit may be mounted on display panel 10.

Figure 2:
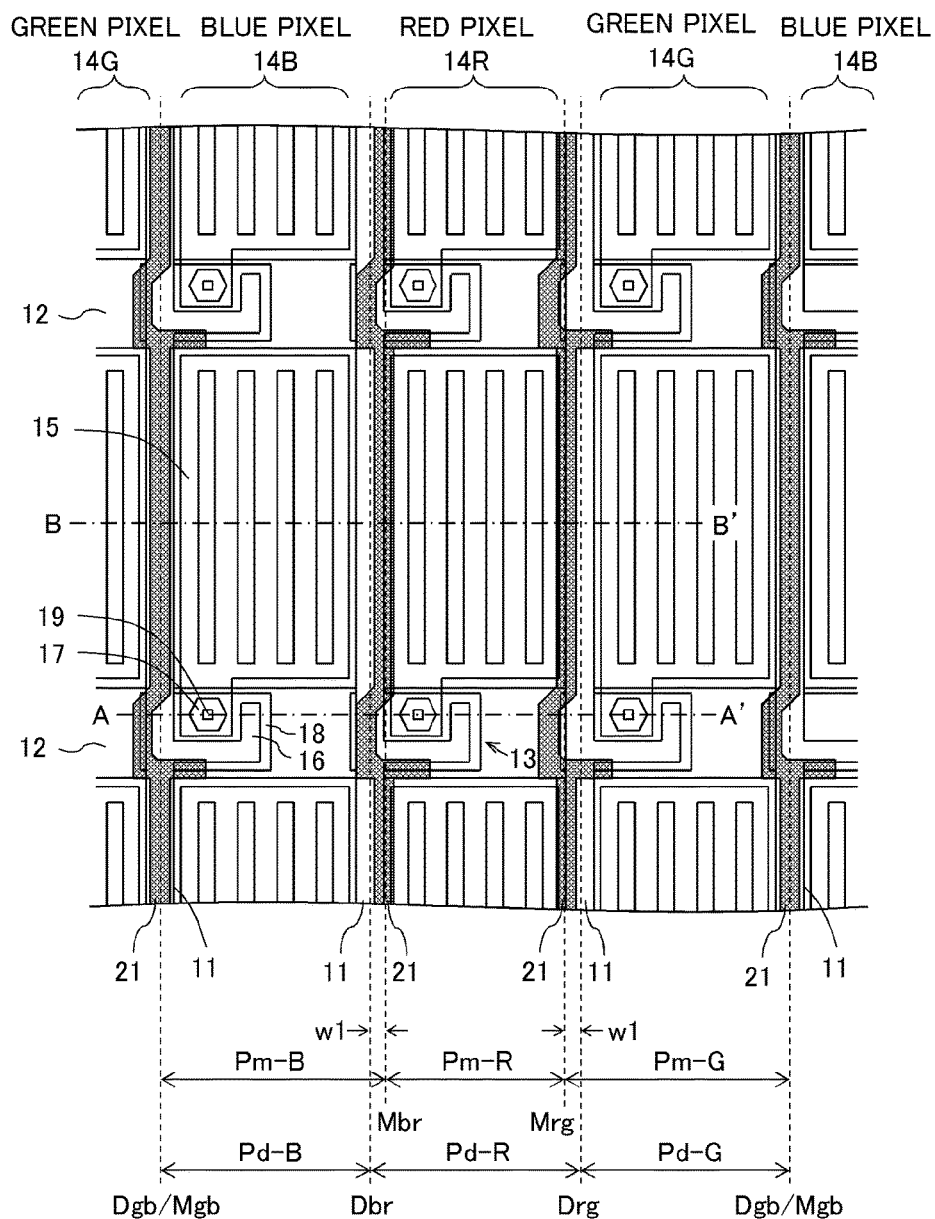
FIG. 2 is a plan view partially illustrating a configuration of display panel.
Figure 3:
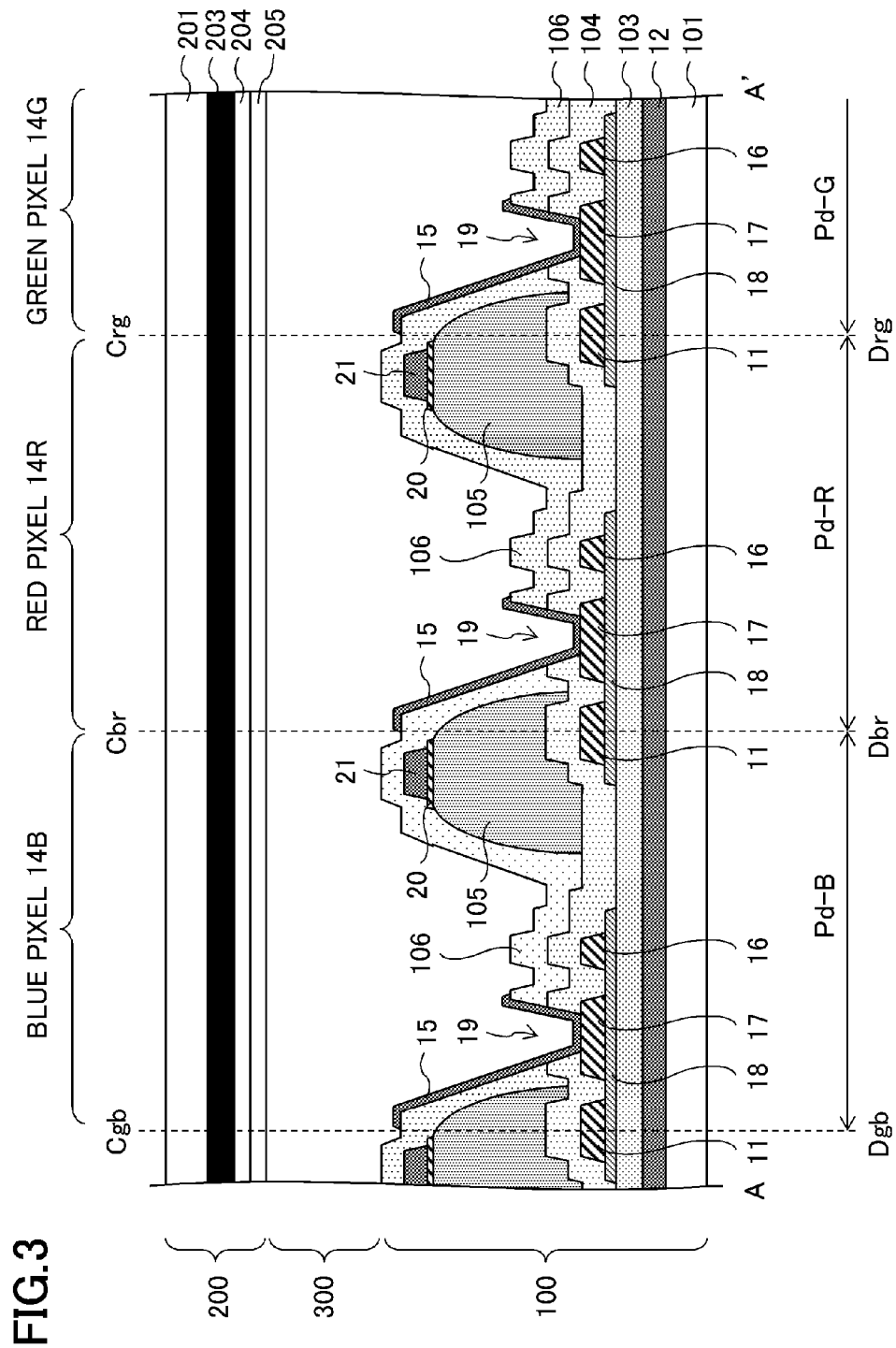
FIG. 3 is a sectional view taken alone a line A-A' in FIG. 2.
Figure 4:
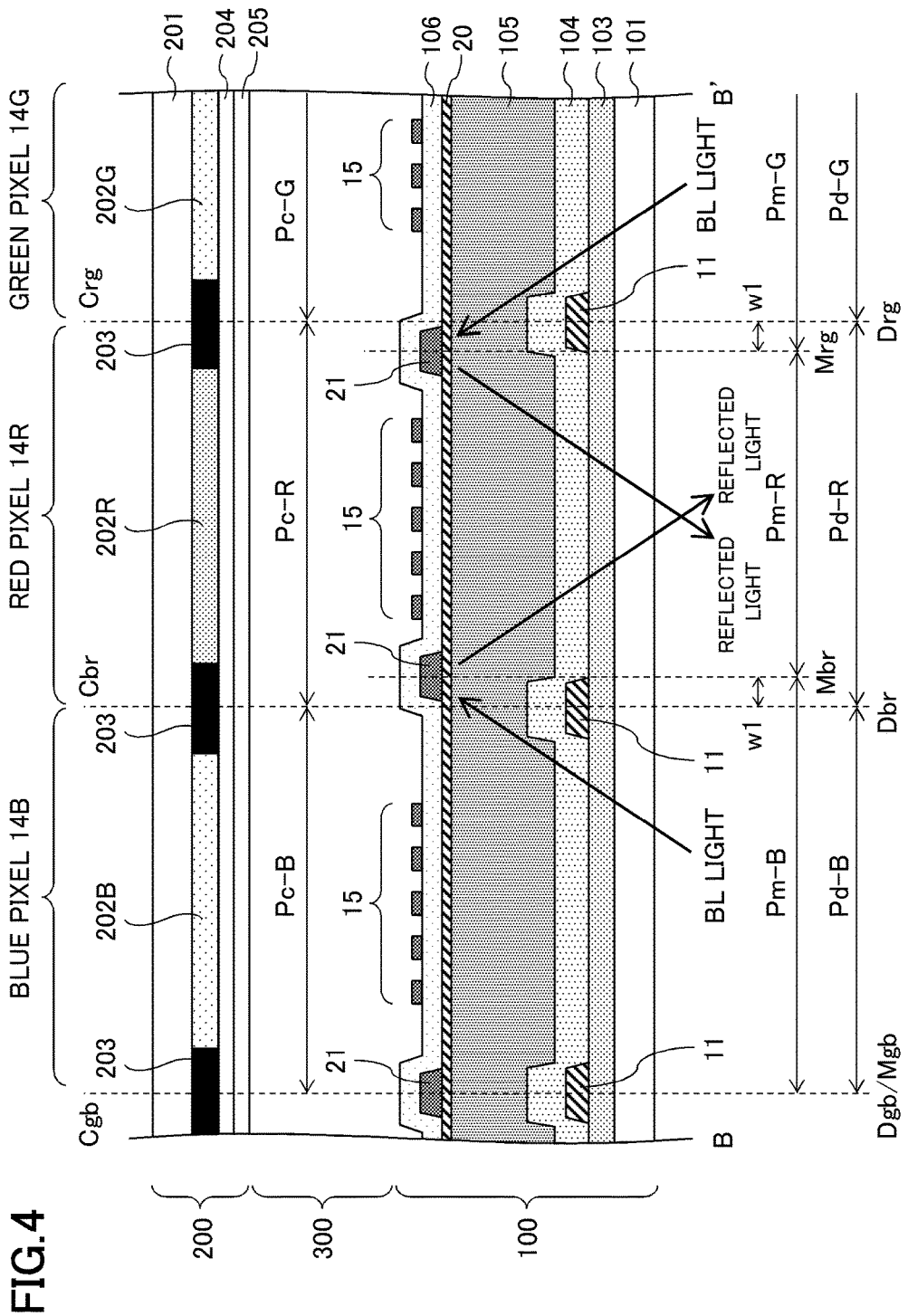
FIG. 4 is a sectional view taken alone a line B-B' in FIG. 2.

FIG. 2 is a plan view partially illustrating a configuration of display panel 10. FIG. 3 is a sectional view taken on a line A-A' in FIG. 2, and FIG. 4 is a sectional view taken on a line B-B' in FIG. 2. As illustrated in FIG. 3, display panel 10 includes thin film transistor substrate (hereinafter, referred to as a TFT substrate) 100 disposed on the rear surface side, color filter substrate (hereinafter, referred to as a CF substrate) 200 that is disposed on the front surface side (display surface side) to face TFT substrate 100, and liquid crystal layer 300 sandwiched between TFT substrate 100 and CF substrate 200. For convenience, FIG. 2 illustrates the state where TFT substrate 100 is seen from the front surface side through CF substrate 200.

As illustrated in FIGS. 1 and 2, a plurality of data lines 11 extending in a first direction (for example, a column direction) and a plurality of gate lines 12 extending in a second direction (for example, a row direction) different from the first direction in TFT substrate 100, thin film transistor (hereinafter, referred to as a TFT) 13 is formed in a neighborhood of each of intersections of the plurality of data lines 11 and the plurality of gate lines 12, a rectangular area surrounded by two adjacent data lines 11 and two adjacent gate lines 12 is defined as one pixel 14, and a plurality of pixels 14 are arranged in a matrix form (the row direction and the column direction). The plurality of data lines 11 are arranged at equal intervals in the row direction, and the plurality of gate lines 12 are arranged at equal intervals in the column direction. Pixel electrode 15 is provided in each pixel 14. As illustrated in FIG. 2, each pixel electrode 15 includes an opening (for example, a slit), and is formed into a stripe shape. One common electrode 20 (see FIGS. 3 and 4) common to each pixel 14 is formed in TFT substrate 100, and a plurality of common electrode wirings 21 are formed on common electrode 20. The plurality of common electrode wirings 21 extend in the first direction (for example, the column direction), and are arranged at predetermined intervals in the second direction (for example, the row direction). A specific arrangement of common electrode wirings 21 will be described later. In TFT 13, semiconductor layer 18 made of amorphous silicon (a-Si) is formed on gate insulator 103 (see FIGS. 3 and 4), and drain electrode 16 and source electrode 17 are formed on semiconductor layer 18. Drain electrode 16 is electrically connected to data line 11, and source electrode 17 and pixel electrode 15 are electrically connected to each other through contact hole 19. Each data line 11 and each common electrode wiring 21 are configured by a metallic wiring containing at least copper Cu. Each data line 11 and each common electrode wiring 21 may have a single-layer structure of copper Cu or a multi-layer structure containing copper Cu.

A data signal (gradation voltage) is supplied from the data line driving circuit to each data line 11, and a gate signal (gate voltage) is supplied from the gate line driving circuit to each gate line 12. Common voltage Vcom is supplied to common electrode 20 through the plurality of common electrode wirings 21 (see FIGS. 3 and 4). When an on voltage (gate-on voltage) of the gate signal is supplied to gate line 12, TFT 13 connected to gate line 12 is turned on to supply data voltage to pixel electrode 15 through data line 11 connected to TFT 13. An electric field is generated by a difference between the data voltage supplied to pixel electrode 15 and common voltage Vcom supplied to common electrode 20. The liquid crystal is driven by the electric field to control transmittance of the light transmitted from the backlight, thereby displaying the image. The desired data voltages are supplied to data lines 11 connected to pixel electrodes 15 of pixels 14, which are formed by striped colored portions to correspond to red, green, and blue, thereby performing color display.

As illustrated in FIG. 4, a plurality of colored portions 202 are formed in CF substrate 200 according to each pixel 14. Each colored portion 202 is surrounded by black matrix 203 that blocks the light transmission, and formed into, for example, a rectangular shape. The plurality of colored portions 202 include red portion 202R that is made of a red (R color) material to transmit red light, green portion 202G that is made of a green (G color) material to transmit green light, and blue portion 202B that is made of a blue (B color) material to transmit blue light. Red portion 202R, green portion 202G, and blue portion 202B are repeatedly arrayed in this order in the row direction, colored portions 202 having the same color are arrayed in the column direction, and black matrix 203 is formed at a boundary between colored portions 202 adjacent to each other in the row direction and the column direction.

As illustrated in FIGS. 1 and 2, the plurality of pixels 14 include red pixel 14R corresponding to red portion 202R, green pixel 14G corresponding to green portion 202G, and blue pixel 14B corresponding to blue portion 202B. Pixels 14 are arrayed according to the arrangement of colored portions 202, red pixel 14R, green pixel 14G, and blue pixel 14B are repeatedly arrayed in this order in the row direction, and pixels 14 having the same color are arrayed in the column direction.

A sectional structure of pixel 14 will specifically be described below with reference to FIGS. 3 and 4. FIG. 3 illustrates a cross-section in which an area including TFT 13 in FIG. 2 is cut in the row direction, and FIG. 4 illustrates a cross-section in which an opening area of pixel 14 in FIG. 2 is cut in the row direction.

Referring to FIG. 3, in TFT substrate 100, gate line 12 is formed on glass substrate 101. Gate line 12 is formed by a metallic material mainly containing aluminum (Al), molybdenum (Mo), titanium (Ti), or copper (Cu), a plurality of laminated layers thereof, an alloy in which tungsten (w), manganese (Mn), or titanium (Ti) is added to the metallic material, or a laminated metallic layer of a combination thereof.

Gate insulator 103 is formed so as to cover gate line 12. Gate insulator 103 can be made of silicon nitride SiN. Semiconductor layer 18 is formed on gate insulator 103. Data line 11 mainly containing copper Cu and drain electrode 16 and source electrode 17, which constitute TFT 13, are formed on semiconductor layer 18. Drain electrode 16 is electrically connected to data line 11.

Interlayer insulator 104 is formed so as to cover data line 11, drain electrode 16, and source electrode 17. Interlayer insulator 104 can be made of silicon nitride SiN or silicon dioxide $SiO_2$.

Organic insulator 105 is formed on interlayer insulator 104. Organic insulator 105 can be made of a photosensitive organic material mainly containing acryl. For example, the organic material has a dielectric constant of 4 or less, which is lower than a dielectric constant of 6.7 of silicon nitride SiN. For the viewpoint of production, an organic material can be deposited thicker than silicon nitride SiN. For example, a thickness of organic insulator 105 is set in a range from 1.5 μm to 3 μm. In organic insulator 105, a thickness can be set larger while the dielectric constant is set lower. Therefore, a wiring capacitance formed between common electrode 20 disposed on organic insulator 105 and data line 11 or gate line 12 disposed below organic insulator 105 can be greatly reduced.

Common electrode 20 is formed on organic insulator 105. Common electrode 20 is made of a transparent electrode material ITO. For example, common electrode 20 can be made of indium tin oxide or indium zinc oxide. An area of each pixel 14 is covered with common electrode 20 except for an area where TFT 13 is formed. That is, common electrode 20 covers data line 11 to serve as a shield electrode. Therefore, for example, an electric field noise generated from data line 11 can be prevented from entering liquid crystal layer 300. Common electrode wiring 21 through which common voltage Vcom is supplied to common electrode 20 is formed on common electrode 20. Common electrode wiring 21 is made of a metallic material mainly containing copper Cu.

Upper insulator 106 is formed so as to cover common electrode 20 and common electrode wiring 21. Upper insulator 106 can be made of silicon nitride SiN. Pixel electrode 15 is formed on upper insulator 106. Pixel electrode 15 is made of a transparent electrode material ITO. Pixel electrode 15 is electrically connected to source electrode 17 through contact hole 19 formed in interlayer insulator 104 and upper insulator 106. Although not illustrated, an alignment film is formed so as to cover pixel electrode 15, and a polarizing plate is formed outside glass substrate 101. In the configuration of FIGS. 3 and 4, common electrode 20 is disposed in a lower layer while pixel electrode 15 is disposed in an upper layer. Alternatively, pixel electrode 15 may be disposed in the lower layer while common electrode 20 is disposed in the upper layer. Organic insulator 105 may be omitted.

In CF substrate 200, colored portion 202 (see FIG. 4) and black matrix 203 are formed on glass substrate 201. For example, colored portion 202 is formed by a colored layer of red, green, and blue pigment-dispersion resists, and black matrix 203 is made of a metallic material or a resin material in which black pigment is used. Overcoat film 204 is formed so as to cover colored portion 202 and black matrix 203, and alignment film 205 is formed on overcoat film 204. Although not illustrated, the polarizing plate is formed outside glass substrate 201. In black matrix 203 extending in the column direction, intervals (array pitch) in the row direction are substantially equal to each other. For example, interval Pc–B between center Cgb and center Cbr of black matrices 203 disposed on both sides of blue portion 202B, interval Pc–R between center Cbr and center Crg of black matrices 203 disposed on both sides of red portion 202R, and interval Pc–G between center Crg and center Cgb of black matrices 203 disposed on both sides of green portion 202G are substantially equal to one another (Pc–B=Pc–R=Pc–G).

The specific arrangement of common electrode wirings 21 will be described below. Common electrode wiring 21 is disposed at a position where the display unevenness caused by the backlight reflected from the Cu wiring can be reduced.

Figure 5:
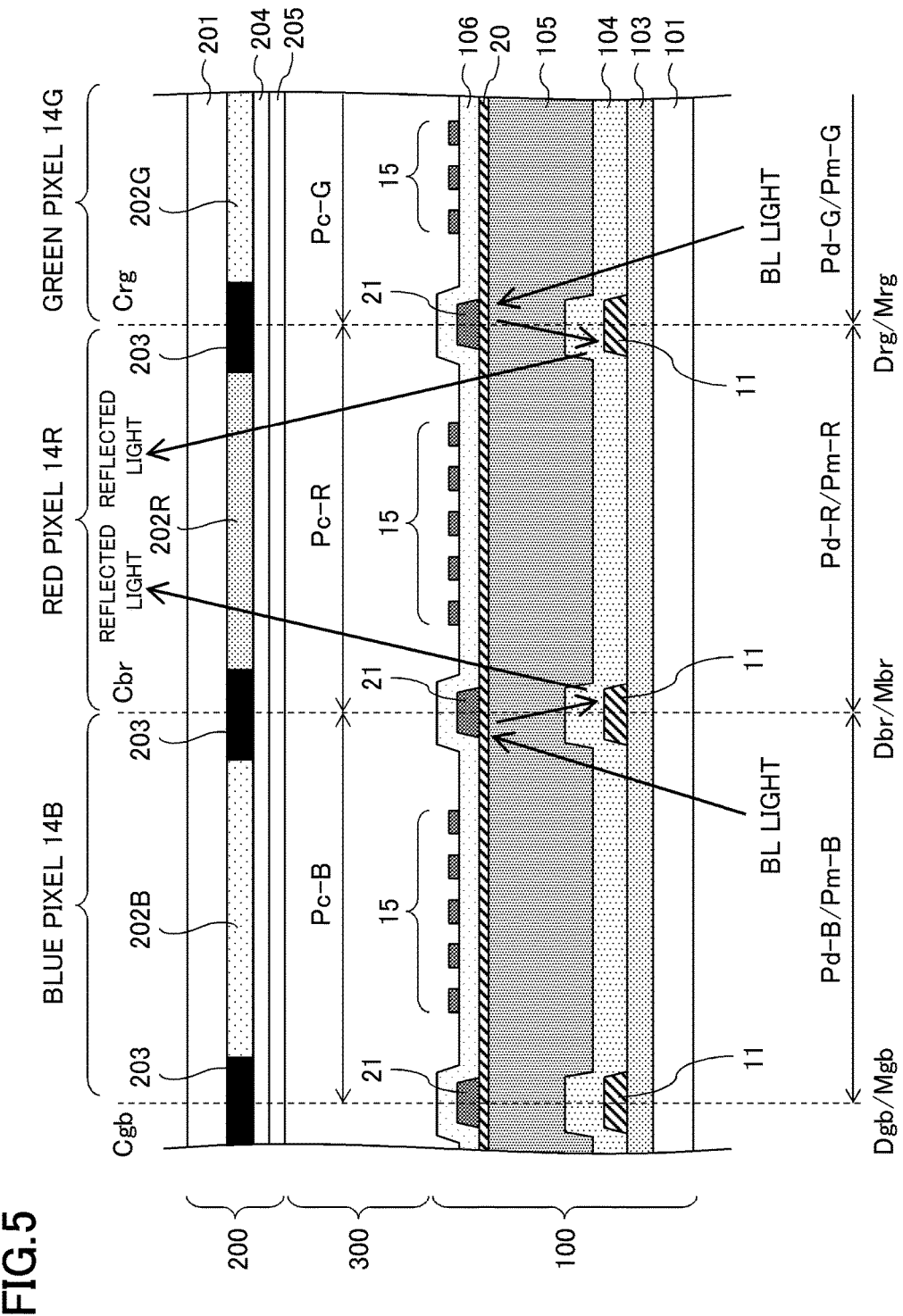
FIG. 5 is a sectional view illustrating a liquid crystal display device according to a comparative example.

A principle of generation of the display unevenness will be described with reference to FIG. 5. FIG. 5 is a sectional view illustrating a liquid crystal display device according to a comparative example. In the comparative example, in black matrix 203 extending in the column direction, the intervals in the row direction are substantially equal to one another (Pc–B=Pc–R=Pc–G), the intervals in the row direction of data line 11 are substantially equal to one another (Pd–B=Pd–R=Pd–G), and the intervals in the row direction of common electrode wiring 21 are substantially equal to one another (Pm–B=Pm–R=Pm–G). The center positions of the widths in the row direction of data line 11, common electrode wiring 21, and black matrix 203 coincide with one another. Specifically, the positions of centers Dgb, Mgb, Cgb of data line 11 disposed at the boundary between green pixel 14G and blue pixel 14B, common electrode wiring 21, black matrix 203 coincide with one another, the positions of centers Dbr, Mbr, Cbr of data line 11 disposed at the boundary between blue pixel 14B and red pixel 14R, common electrode wiring 21, and black matrix 203 coincide with one another, and the positions of centers Drg, Mrg, Crg of data line 11 disposed at the boundary between red pixel 14R and green pixel 14G, common electrode wiring 21, and black matrix 203 coincide with one another.

In the configuration of the comparative example, when attention is paid to red pixel 14R, the backlight (BL light) radiated on blue pixel 14B and green pixel 14G, which are adjacent to red pixel 14R, is reflected from common electrode wiring 21 disposed at the boundary between blue pixel 14B and red pixel 14R or common electrode wiring 21 disposed at the boundary between red pixel 14R and green pixel 14G, and the reflected light is again reflected from data line 11 disposed at the boundary between blue pixel 14B and red pixel 14R or data line 11 disposed at the boundary between red pixel 14R and green pixel 14G. Because common electrode wiring 21 and data line 11 are the metallic wiring made of copper Cu, the reflected light beams include the red color as the main component. Therefore, the light reflected from data line 11 exits outward (display surface side) from CF substrate 200 through red portion 202R to cause the display unevenness.

On the other hand, liquid crystal display device 1 according to the exemplary embodiment has a configuration that blocks the exit of the reflected light toward the outside (display surface side). A specific configuration will be described with reference to FIGS. 2 and 4.

The arrangements of black matrix 203 and data line 11 are similar to those of the comparative example in FIG. 5. That is, in black matrix 203 extending in the column direction, the intervals in the row direction are substantially equal to one another (Pc–B=Pc–R=Pc–G), and the intervals in the row direction of data line 11 are substantially equal to one another (Pd–B=Pd–R=Pd–G).

On the other hand, for common electrode wiring 21, the interval of common electrode wiring 21 corresponding to red pixel 14R is different from the interval of common electrode wiring 21 corresponding to other pixels. Specifically, the position of center Mgb of common electrode wiring 21 disposed at the boundary between green pixel 14G and blue pixel 14B coincides with the positions of center Dgb of data line 11 and center Cgb of black matrix 203, the position of center Mbr of common electrode wiring 21 disposed at the boundary between blue pixel 14B and red pixel 14R is displaced to a red pixel 14R side from the positions of center Dbr of data line 11 and center Cbr of black matrix 203, and the position of center Mrg of common electrode wiring 21 disposed at the boundary between red pixel 14R and green pixel 14G is displaced to the red pixel 14R side from the positions of center Drg of data line 11 and center Crg of black matrix 203. For example, as illustrated in FIGS. 2 and 4, the position of center Mbr of common electrode wiring 21 disposed at the boundary between blue pixel 14B and red pixel 14R is displaced to the red pixel 14R side by width w1 from the positions of centers Dbr, Cbr, and the position of center Mrg of common electrode wiring 21 disposed at the boundary between red pixel 14R and green pixel 14G is displaced to the red pixel 14R side by width w1 from the positions of centers Drg, Crg. Widths w1 may be equal to or different from each other. Thus, interval Pm–R in the row direction of common electrode wiring 21 corresponding to red pixel 14R is smaller than interval Pm–B in the row direction of common electrode wiring 21 corresponding to blue pixel 14B and interval Pm–G in the row direction of common electrode wiring 21 corresponding to green pixel 14G (Pm–R<Pm–B, Pm–R<Pm–G).

When attention is paid to black matrix 203, as illustrated in FIG. 4, interval Pc–R of the portion corresponding to red pixel 14R is equal to interval Pd–R of data line 11, and is larger than interval Pm–R of common electrode wiring 21.

In the configuration of liquid crystal display device 1, even if the backlight (BL light) radiated on blue pixel 14B and green pixel 14G, which are adjacent to red pixel 14R, is reflected from common electrode wiring 21 disposed at the boundary between blue pixel 14B and red pixel 14R or common electrode wiring 21 disposed at the boundary between red pixel 14R and green pixel 14G, the reflected light hardly arrives at data line 11 disposed at the boundary between blue pixel 14B and red pixel 14R or data line 11 disposed at the boundary between red pixel 14R and green pixel 14G, and exits onto the rear surface side of TFT substrate 100. That is, the reflected light including the red color caused by the reflectance of the backlight from data line 11 and common electrode wiring 21 as the main component can be suppressed from being incident on red portion 202R. The reflected light exiting outward (display surface side) from CF substrate 200 is reduced, so that the display unevenness can be reduced.

Figure 6:
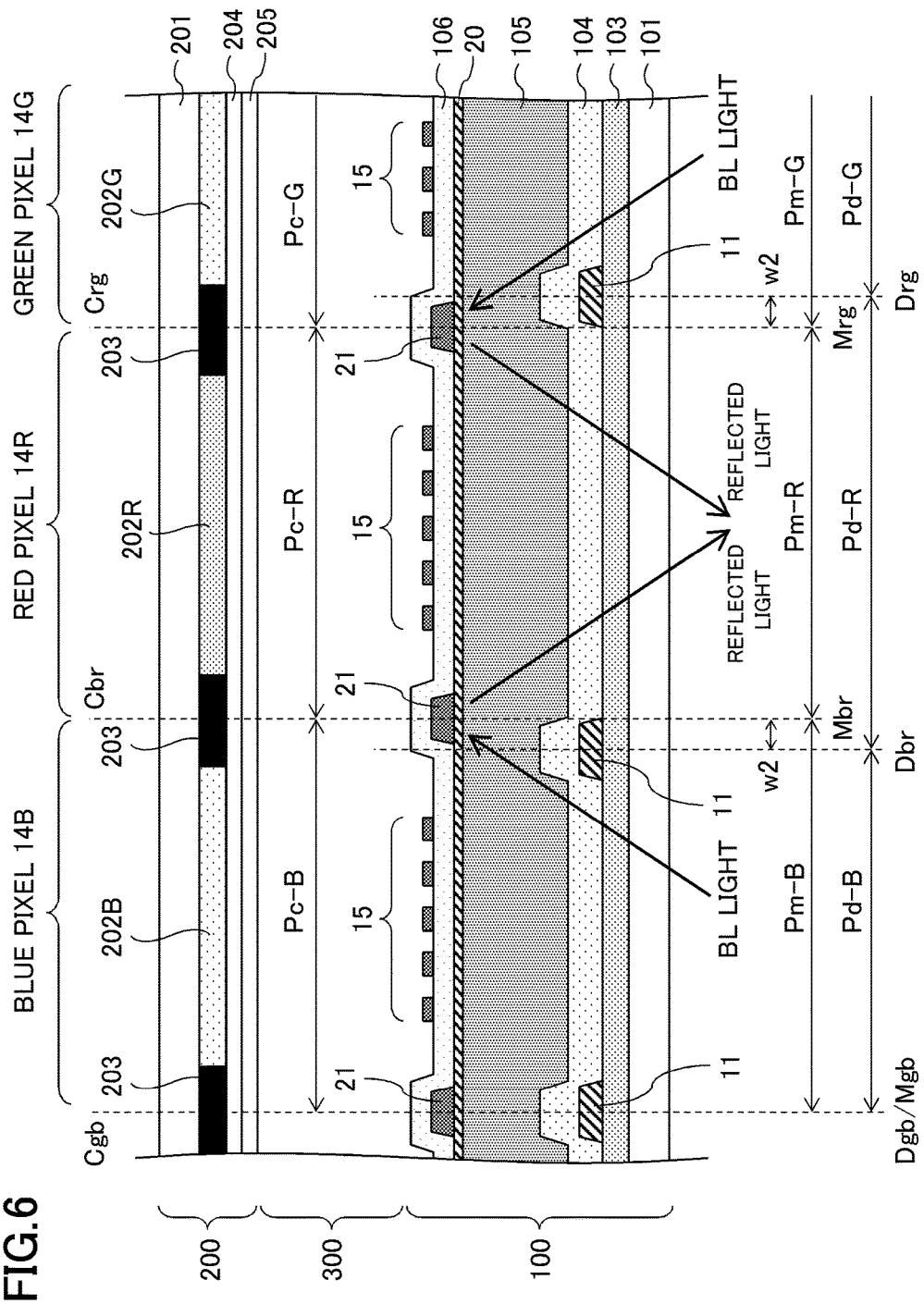
FIG. 6 is a sectional view illustrating a configuration of liquid crystal display device according to a first modification.

Liquid crystal display device 1 of the exemplary embodiment is not limited to the above configuration. FIG. 6 is a sectional view illustrating a configuration of liquid crystal display device 1 according to a first modification. A planar configuration of liquid crystal display device 1 according to the first modification is omitted, and a portion corresponding to a sectional configuration in FIG. 4 is illustrated.

In liquid crystal display device 1 according to the first modification, black matrices 203 extending in the column direction are arranged at equal intervals in the row direction, common electrode wirings 21 are arranged at equal intervals in the row direction, and the interval of data line 11 corresponding to red pixel 14R is different from the intervals of data lines 11 corresponding to other pixels. That is, in black matrix 203 extending in the column direction, the intervals in the row direction are substantially equal to one another (Pc–B=Pc–R=Pc–G), and the intervals in the row direction of common electrode wiring 21 are substantially equal to one another (Pm–B=Pm–R=Pm–G). The position of center Dgb of data line 11 disposed at the boundary between green pixel 14G and blue pixel 14B coincides with the positions of center Mgb of common electrode wiring 21 and center Cgb of black matrix 203, the position of center Dbr of data line 11 disposed at the boundary between blue pixel 14B and red pixel 14R is displaced to a blue pixel 14B side from the positions of center Mbr of common electrode wiring 21 and center Cbr of black matrix 203, and the position of center Drg of data line 11 disposed at the boundary between red pixel 14R and green pixel 14G is displaced to a green pixel 14G side from the positions of center Mrg of common electrode wiring 21 and center Crg of black matrix 203. For example, as illustrated in FIG. 6, the position of center Dbr of data line 11 disposed at the boundary between blue pixel 14B and red pixel 14R is displaced to the blue pixel 14B side by width w2 from the positions of centers Mbr, Cbr, and the position of center Drg of data line 11 disposed at the boundary between red pixel 14R and green pixel 14G is displaced to the green pixel 14G side by width w2 from the positions of centers Mrg, Crg. Widths w2 may be equal to or different from each other. Thus, interval Pd–R in the row direction of data line 11 corresponding to red pixel 14R is larger than interval Pd–B in the row direction of data line 11 corresponding to blue pixel 14B and interval Pd–G in the row direction of data line 11 corresponding to green pixel 14G (Pd–R>Pd–B, Pd–R>Pd–G). In liquid crystal display device 1 according to the first modification, when attention is paid to common electrode wiring 21, the position of center Mbr of common electrode wiring 21 is displaced to the red pixel 14R side from the position of center Dbr of data line 11, and the position of center Mrg of common electrode wiring 21 is displaced to the red pixel 14R side from the position of center Drg of data line 11.

When attention is paid to black matrix 203, as illustrated in FIG. 6, interval Pc–R of the portion corresponding to red pixel 14R is smaller than interval Pd–R of data line 11, and is equal to interval Pm–R of common electrode wiring 21.

In the configuration of liquid crystal display device 1 according to the first modification, similarly to the configuration in FIG. 4, the backlight reflected from common electrode wiring 21 hardly arrives at data line 11 disposed at the boundary between blue pixel 14B and red pixel 14R or data line 11 disposed at the boundary between red pixel 14R and green pixel 14G, and exits onto the rear surface side of TFT substrate 100. The reflected light exiting outward (to display surface side) from CF substrate 200 is reduced, so that the display unevenness can be reduced.

Figure 7:
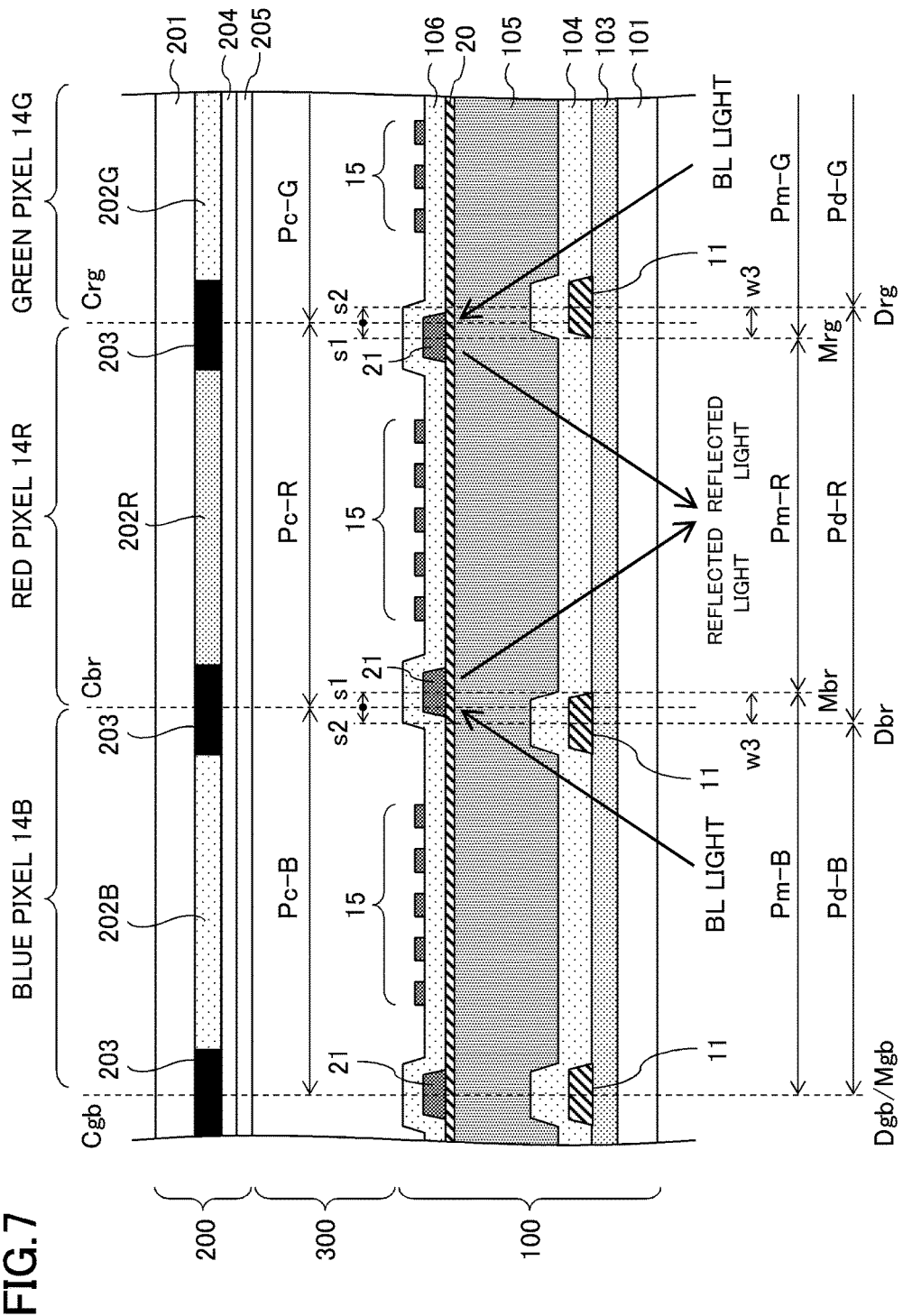
FIG. 7 is a sectional view illustrating a configuration of liquid crystal display device according to a second modification.

FIG. 7 is a sectional view illustrating a configuration of liquid crystal display device 1 according to a second modification. The planar configuration of liquid crystal display device 1 according to the second modification is omitted, and the portion corresponding to the sectional configuration in FIG. 4 is illustrated.

In liquid crystal display device 1 according to the second modification, black matrices 203 extending in the column direction are arranged at equal intervals in the row direction, and the intervals of data line 11 and common electrode wirings 21 corresponding to red pixel 14R are different from the intervals of data line 11 and common electrode wiring 21 corresponding to other pixels. That is, in black matrix 203 extending in the column direction, the intervals in the row direction are substantially equal to one another (Pc–B=Pc–R=Pc–G).

The position of center Mgb of common electrode wiring 21 disposed at the boundary between green pixel 14G and blue pixel 14B coincides with the position of center Cgb of black matrix 203, the position of center Mbr of common electrode wiring 21 disposed at the boundary between blue pixel 14B and red pixel 14R is displaced to the red pixel 14R side from the position of center Cbr of black matrix 203, and the position of center Mrg of common electrode wiring 21 disposed at the boundary between red pixel 14R and green pixel 14G is displaced to the red pixel 14R side from the position of center Crg of black matrix 203. For example, as illustrated in FIG. 7, the position of center Mbr of common electrode wiring 21 disposed at the boundary between blue pixel 14B and red pixel 14R is displaced to the red pixel 14R side by width s1 from the position of center Cbr, and the position of center Mrg of common electrode wiring 21 disposed at the boundary between red pixel 14R and green pixel 14G is displaced to the red pixel 14R side by width s1 from the position of center Crg. Widths s1 may be equal to or different from each other. Thus, interval Pm-R in the row direction of common electrode wiring 21 corresponding to red pixel 14R is smaller than interval Pm-B in the row direction of common electrode wiring 21 corresponding to blue pixel 14B and interval Pm-G in the row direction of common electrode wiring 21 corresponding to green pixel 14G (Pm-R<Pm-B, Pm-R<Pm-G).

The position of center Dgb of data line 11 disposed at the boundary between green pixel 14G and blue pixel 14B coincides with the position of center Cgb of black matrix 203, the position of center Dbr of data line 11 disposed at the boundary between blue pixel 14B and red pixel 14R is displaced to the blue pixel 14B side from the position of center Cbr of black matrix 203, and the position of center Drg of data line 11 disposed at the boundary between red pixel 14R and green pixel 14G is displaced to the blue pixel 14B side from the position of center Crg of black matrix 203. For example, as illustrated in FIG. 7, the position of center Dbr of data line 11 disposed at the boundary between blue pixel 14B and red pixel 14R is displaced to the green pixel 14G side by width s2 from the positions of center Cbr, and the position of center Drg of data line 11 disposed at the boundary between red pixel 14R and green pixel 14G is displaced to the green pixel 14G side by width s2 from the positions of center Crg. Widths s2 may be equal to or different from each other. Widths s1, s2 may be equal to or different from each other. In liquid crystal display device 1 according to the second modification, when attention is paid to common electrode wiring 21, the position of center Mbr of common electrode wiring 21 is displaced to the red pixel 14R side from the position of center Dbr of data line 11, and the position of center Mrg of common electrode wiring 21 is displaced to the red pixel 14R side from the position of center Drg of data line 11.

When attention is paid to black matrix 203, as illustrated in FIG. 7, interval Pc-R of the portion corresponding to red pixel 14R is smaller than interval Pd-R of data line 11, and is larger than interval Pm-R of common electrode wiring 21.

In the configuration of liquid crystal display device 1 according to the second modification, similarly to the configuration in FIG. 4, the backlight reflected from common electrode wiring 21 hardly arrives at data line 11 disposed at the boundary between blue pixel 14B and red pixel 14R or data line 11 disposed at the boundary between red pixel 14R and green pixel 14G, and exits onto the rear surface side of TFT substrate 100. The reflected light exiting outward (to display surface side) from CF substrate 200 is reduced, so that the display unevenness can be reduced. In the configuration of liquid crystal display device 1 according to the second modification, an amount of displacement from the center of black matrix 203 can be decreased at the centers of common electrode wiring 21 and data line 11 while distance w3 between common electrode wiring 21 and data line 11 is maintained at the value equal to distance w1 in the configuration of FIG. 4 and distance w2 in the configuration of FIG. 6. Therefore, for example, even if displacement occurs when TFT substrate 100 and CF substrate 200 are bonded to each other in a manufacturing process, a margin is largely ensured in order to compensate the displacement, so that degradation of a pixel aperture and light transmittance can be reduced.

In liquid crystal display device 1 according to the exemplary embodiment, common electrode wiring 21 disposed at the boundary between red pixel 14R and pixels (for example, blue pixel 14B and green pixel 14G) adjacent to red pixel 14R is disposed on the red pixel 14R side with respect to data line 11 disposed at the boundary.

Figure 8:
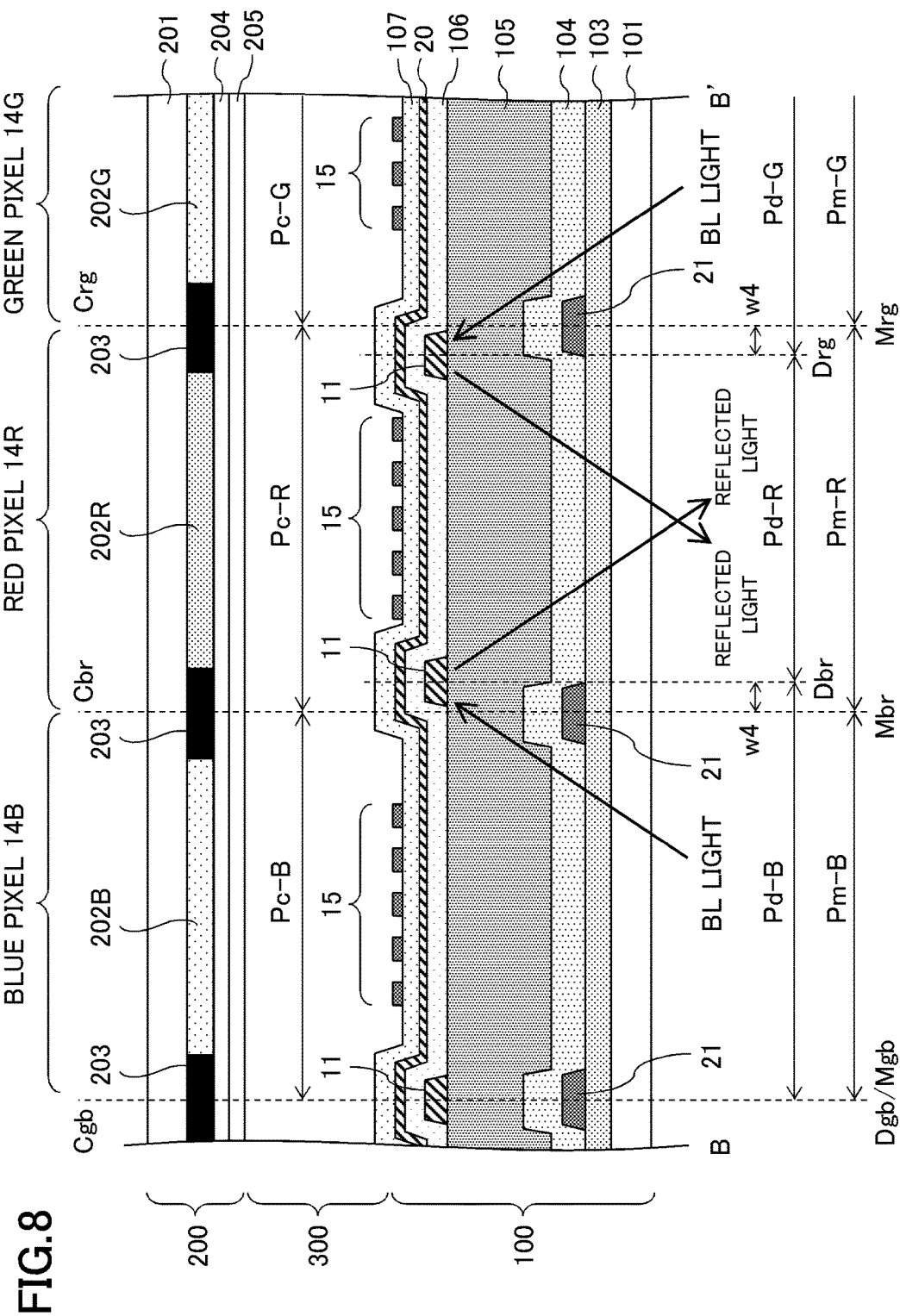
FIG. 8 is a sectional view illustrating a configuration of liquid crystal display device according to a third modification.

FIG. 8 is a sectional view illustrating a configuration of liquid crystal display device 1 according to a third modification. The planar configuration of liquid crystal display device 1 according to the third modification is omitted, and the portion corresponding to the sectional configuration in FIG. 4 is illustrated.

In liquid crystal display device 1 according to the third modification, the positions of data line 11 and common electrode wiring 21 are reversed in the configuration of FIG. 4. Specifically, as illustrated in FIG. 8, common electrode wiring 21 is formed on gate insulator 103, and interlayer insulator 104 is formed so as to cover common electrode wiring 21. Data line 11 is formed on organic insulator 105, and upper insulator 106 is formed so as to cover data line 11. Common electrode 20 is formed on upper insulator 106, and insulator 107 is formed so as to cover common electrode 20. Common electrode wiring 21 is electrically connected to common electrode 20 through a contact hole (not illustrated).

In black matrix 203 extending in the column direction, the intervals in the row direction are substantially equal to one another (Pc-B=Pc-R=Pc-G), and the intervals in the row direction of common electrode wiring 21 are substantially equal to one another (Pm-B=Pm-R=Pm-G). The position of center Dgb of data line 11 disposed at the boundary between green pixel 14G and blue pixel 14B coincides with the positions of center Mgb of common electrode wiring 21 and center Cgb of black matrix 203, the position of center Dbr of data line 11 disposed at the boundary between blue pixel 14B and red pixel 14R is displaced to the red pixel 14R side from the positions of center Mbr of common electrode wiring 21 and center Cbr of black matrix 203, and the position of center Drg of data line 11 disposed at the boundary between red pixel 14R and green pixel 14G is displaced to the red pixel 14R side from the positions of center Mrg of common electrode wiring 21 and center Crg of black matrix 203. For example, as illustrated in FIG. 8, the position of center Dbr of data line 11 disposed at the boundary between blue pixel 14B and red pixel 14R is displaced to the red pixel 14R side by width w4 from the positions of centers Mbr, Cbr, and the position of center Drg of data line 11 disposed at the boundary between red pixel 14R and green pixel 14G is displaced to the red pixel 14R side by width w4 from the positions of centers Mrg, Crg. Widths w4 may be equal to or different from each other. Thus, interval Pd-R in the row direction of data line 11 corresponding to red pixel 14R is smaller than interval Pd-B in the row direction of data line 11 corresponding to blue pixel 14B and interval Pd-G in the row direction of data line 11 corresponding to green pixel 14G (Pd-R<Pd-B, Pd-R<Pd-G). When attention is paid to common electrode wiring 21, the position of center Mbr of common electrode wiring 21 is displaced to the blue pixel 14B side from the position of center Dbr of data line 11, and the position of center Mrg of common electrode wiring 21 is displaced to the green pixel 14G side from the position of center Drg of data line 11.

Thus, in liquid crystal display device 1 according to the exemplary embodiment, data line 11 disposed at the boundary between red pixel 14R and pixels (for example, blue pixel 14B and green pixel 14G) adjacent to red pixel 14R may be disposed on the red pixel 14R side with respect to common electrode wiring 21 disposed at the boundary.

Figure 9:
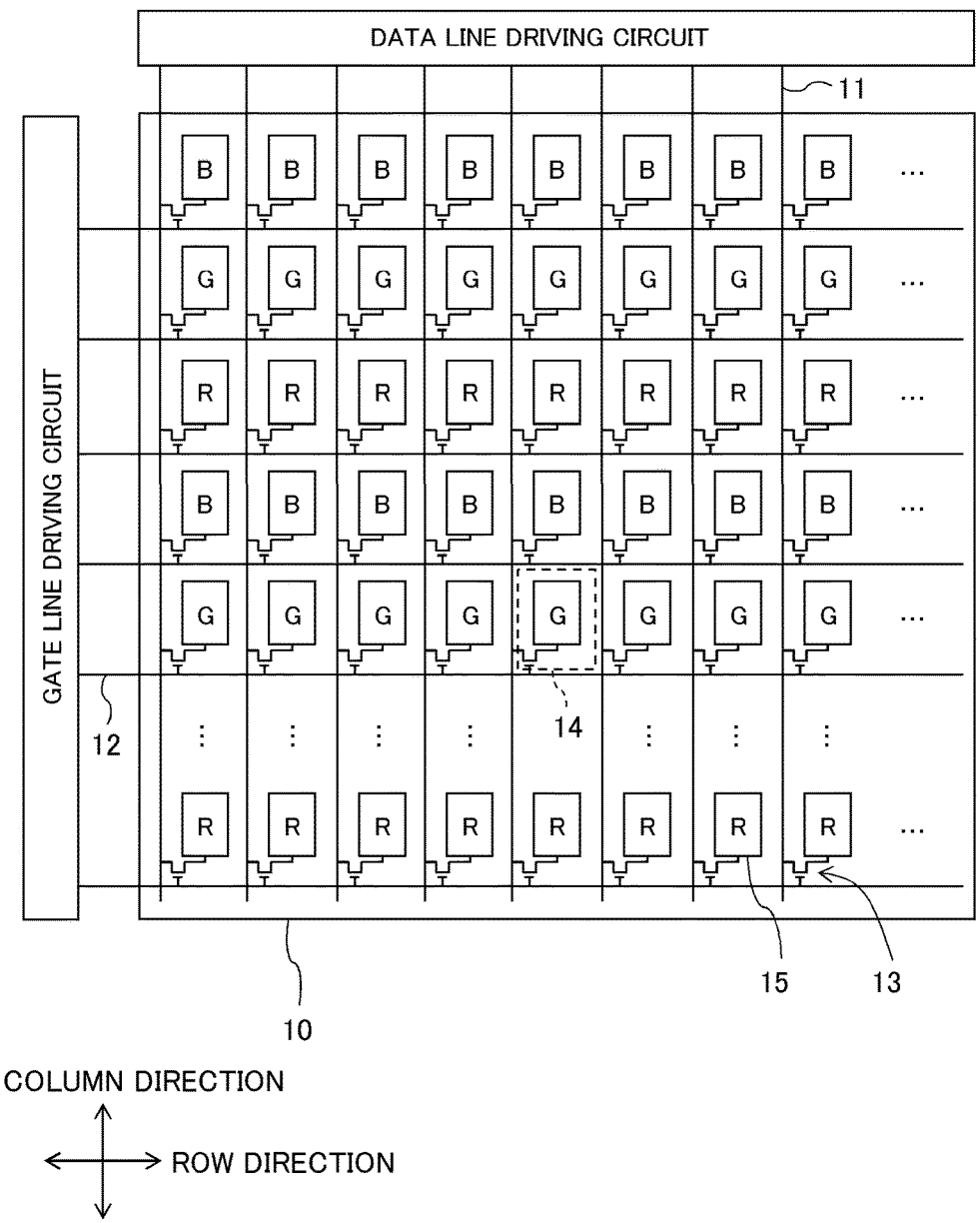
FIG. 9 is a plan view illustrating an arrangement of pixels of liquid crystal display device according to a fourth modification.
Figure 10:
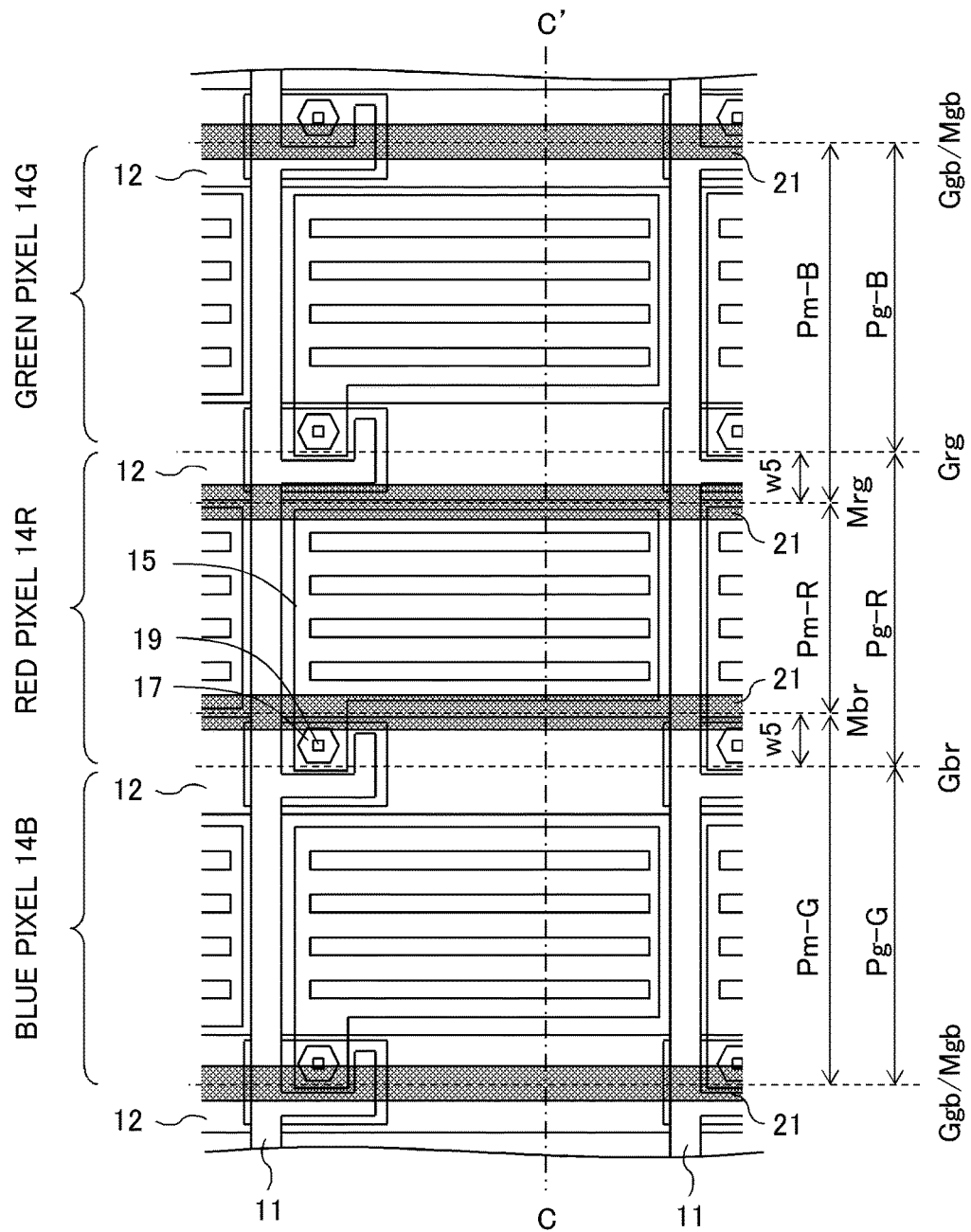
FIG. 10 is a plan view partially illustrating a configuration of display panel of the fourth modification.

FIG. 9 is a plan view illustrating an arrangement of pixels 14 of liquid crystal display device 1 according to a fourth modification. FIG. 10 is a plan view partially illustrating a configuration of display panel 10 of the fourth modification.

In liquid crystal display device 1 according to the fourth modification, red pixel 14R, green pixel 14G, and blue pixel 14B are repeatedly arrayed in this order in the column direction, and pixels 14 having the same color are arrayed in the row direction.

In liquid crystal display device 1 according to the fourth modification, as illustrated in FIG. 10, a plurality of common electrode wirings 21 extend in the row direction, and are arranged at predetermined intervals in the column direction. Common electrode wiring 21 is disposed such that at least a part of common electrode wiring 21 overlaps gate line 12 in planar view.

Figure 11:
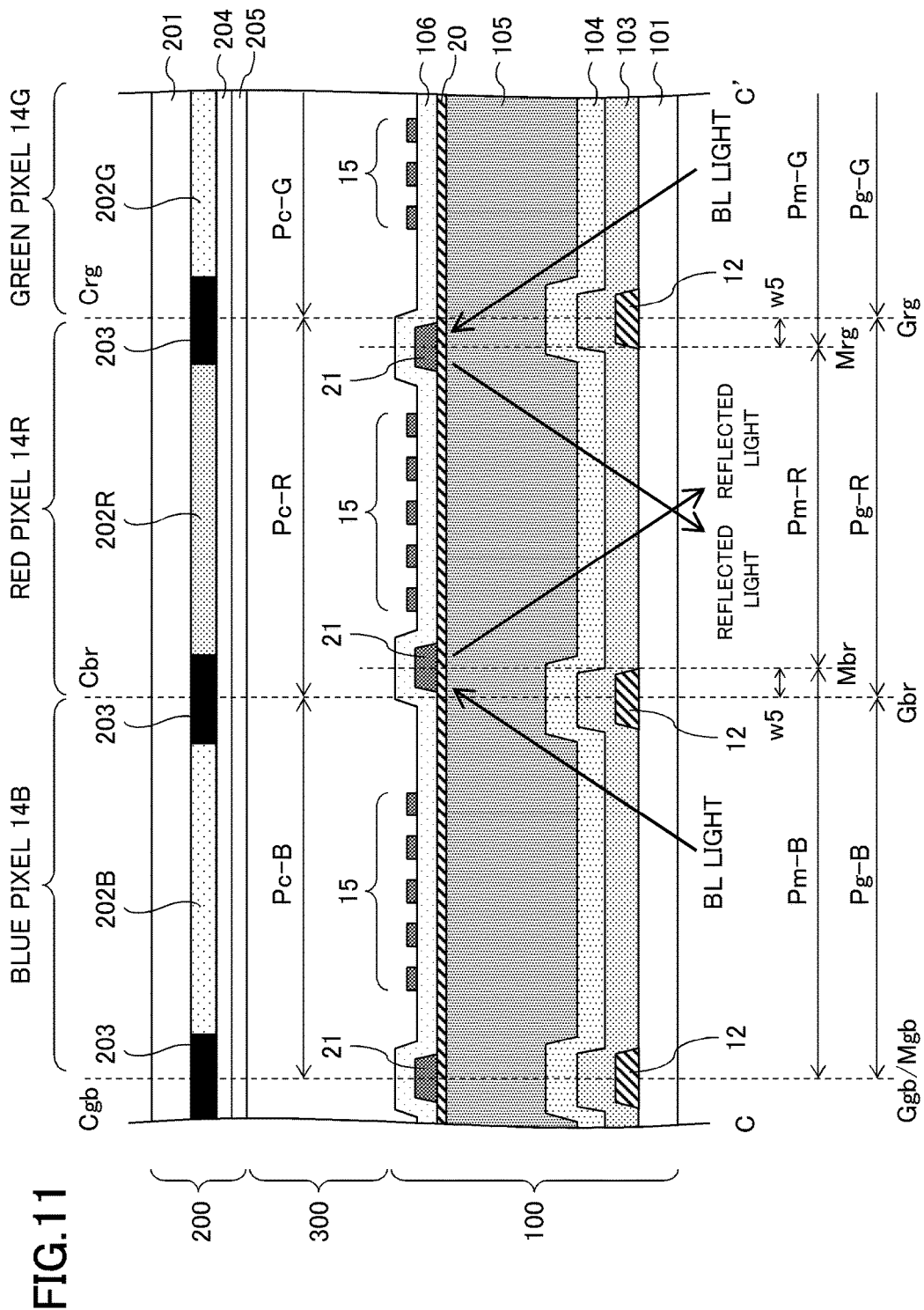
FIG. 11 illustrates a cross-section in which the opening area of pixel 14 in FIG. 10 is cut in the column direction.

FIG. 11 illustrates a cross-section in which the opening area of pixel 14 in FIG. 10 is cut in the column direction. The description of the same configuration as the sectional configuration in FIG. 4 is omitted as appropriate. In black matrix 203 extending in the column direction, the intervals in the column direction are substantially equal to one another (Pc–B=Pc–R=Pc–G), and the intervals in the column direction of gate line 12 are substantially equal to one another (Pg–B=Pg–R=Pg–G). The position of center Mgb of common electrode wiring 21 disposed at the boundary between green pixel 14G and blue pixel 14B coincides with the positions of center Ggb of gate line 12 and center Cgb of black matrix 203, the position of center Mbr of common electrode wiring 21 disposed at the boundary between blue pixel 14B and red pixel 14R is displaced to the red pixel 14R side from the positions of center Gbr of gate line 12 and center Cbr of black matrix 203, and the position of center Mrg of common electrode wiring 21 disposed at the boundary between red pixel 14R and green pixel 14G is displaced to the red pixel 14R side from the positions of center Grg of gate line 12 and center Crg of black matrix 203. For example, as illustrated in FIGS. 10 and 11, the position of center Mbr of common electrode wiring 21 disposed at the boundary between blue pixel 14B and red pixel 14R is displaced to the red pixel 14R side by width w5 from the positions of centers Gbr, Cbr, and the position of center Mrg of common electrode wiring 21 disposed at the boundary between red pixel 14R and green pixel 14G is displaced to the red pixel 14R side by width w5 from the positions of centers Grg, Crg. Widths w5 may be equal to or different from each other. Thus, interval Pm–R in the column direction of common electrode wiring 21 corresponding to red pixel 14R is smaller than interval Pm–B in the column direction of common electrode wiring 21 corresponding to blue pixel 14B and interval Pm–G in the column direction of common electrode wiring 21 corresponding to green pixel 14G (Pm–R<Pm–B, Pm–R<Pm–G). When attention is paid to gate line 12, the position of center Gbr of gate line 12 is displaced to the blue pixel 14B side from the position of center Mbr of common electrode wiring 21, and the position of center Grg of gate line 12 is displaced to the green pixel 14G side from the position of center Mrg of common electrode wiring 21.

Thus, in liquid crystal display device 1 according to the exemplary embodiment, common electrode wiring 21, which is disposed at the boundary between red pixel 14R and pixels (for example, blue pixel 14B and green pixel 14G) adjacent to red pixel 14R while extending in the row direction, may be disposed on the red pixel 14R side with respect to gate line 12 disposed at the boundary.

As another modification, in black matrix 203 extending in the row direction, the intervals in the column direction may be substantially equal to one another (Pc–B=Pc–R=Pc–G), the intervals in the column direction of common electrode wiring 21 may be substantially equal to one another (Pm–B=Pm–R=Pm–G), the position of center Ggb of gate line 12 may coincide with the positions of center Mgb of common electrode wiring 21 and center Cgb of black matrix 203, the position of center Gbr of gate line 12 disposed at the boundary between blue pixel 14B and red pixel 14R may be displaced to the blue pixel 14B side from the positions of center Mbr of common electrode wiring 21 and center Cbr of black matrix 203, and the position of center Grg of gate line 12 disposed at the boundary between red pixel 14R and green pixel 14G may be displaced to the green pixel 14G side from the positions of center Mrg of common electrode wiring 21 and center Crg of black matrix 203.

In liquid crystal display device 1 described above, colored portion 202 includes red portion 202R, green portion 202G, and blue portion 202B. However, the present disclosure is not limited thereto. Colored portion 202 may include a colored portion that transmits colors other than red, blue, and green. Preferably, data line 11, common electrode wiring 21, and black matrix 203 at least partially overlap one another in planar view.

As described above, liquid crystal display device 1 has the IPS type pixel structure. However, the present disclosure is not limited thereto. In liquid crystal display device 1, common electrode wiring 21 is cited as an example of the Cu wiring. However, the present disclosure is not limited thereto, and the Cu wiring may be used for other applications.

What is claimed is:

1. A liquid crystal display device comprising:
    a first substrate;
    a second substrate disposed opposite to the first substrate; and
    a liquid crystal layer sandwiched between the first substrate and the second substrate,
    wherein the first substrate includes a plurality of first wirings extending in a first direction, a plurality of second wirings extending in a second direction different from the first direction, a plurality of third wirings that extend in the first direction and at least partially overlaps the first wiring, a plurality of pixel electrodes, a common electrode disposed opposite to the plurality of pixel electrodes, and a plurality of pixels disposed in the first direction and the second direction,
    the second substrate includes a blue portion transmitting blue light, a red portion transmitting red light, a green portion transmitting green light, and a light shielding portion disposed at each boundary of the blue portion, the red portion, and the green portion to block the light transmission of each color,
    the plurality of pixels include a blue pixel corresponding to the blue portion, a red pixel corresponding to the red portion, and a green pixel corresponding to the green portion,
    the plurality of third wirings are formed closer to the liquid crystal layer than the plurality of first wirings are,
    a center position of a width in the second direction of the third wiring disposed at the boundary between the blue pixel and the red pixel is displaced to a red pixel side from a center position of a width in the second direction of the first wiring disposed at the boundary between the blue pixel and the red pixel, and a center position of a width in the second direction of the third wiring disposed at the boundary between the red pixel and the green pixel is displaced to the red pixel side from a center position of a width in the second direction of the first wiring disposed at the boundary between the red pixel and the green pixel.

2. The liquid crystal display device according to claim 1, wherein a displacement amount between the center position of the width in the second direction of the third wiring disposed at the boundary between the red pixel and the green pixel and the center position of the width in the second direction of the first wiring disposed at the boundary between the red pixel and the green pixel is larger than a displacement amount between the center position of the width in the second direction of the third wiring disposed at the boundary between the blue pixel and the green pixel and the center position of the width in the second direction of the first wiring disposed at the boundary between the blue pixel and the green pixel.

3. The liquid crystal display device according to claim 1, wherein the plurality of first wirings and the plurality of third wirings are made of a metallic material containing copper.

4. The liquid crystal display device according to claim 3, wherein the first wiring is a data line, the second wiring is a gate line, and the third wiring is a common electrode wiring through which a common voltage is supplied to the common electrode.

5. The liquid crystal display device according to claim 4, wherein the plurality of data lines are arranged at equal intervals in the second direction.

6. The liquid crystal display device according to claim 4, wherein
the plurality of common electrode wirings are arranged at equal intervals in the second direction,
the center position of the width in the second direction of the data line disposed at the boundary between the blue pixel and the red pixel is displaced to a blue pixel side from the center position of the width in the second direction of the common electrode wiring disposed at the boundary between the blue pixel and the red pixel, and the center position of the width in the second direction of the data line disposed at the boundary between the red pixel and the green pixel is displaced to a green pixel side from the center position of the width in the second direction of the common electrode wiring disposed at the boundary between the red pixel and the green pixel.

7. The liquid crystal display device according to claim 4, wherein
the light shielding portions extending in the first direction are arranged at equal intervals in the second direction,
the center position of the width in the second direction of the common electrode wiring disposed at the boundary between the blue pixel and the red pixel is displaced to the red pixel side from the center position of the width in the second direction of the light shielding portion disposed at the boundary between the blue portion and the red portion, the center position of the width in the second direction of the data line disposed at the boundary between the blue pixel and the red pixel is displaced to the blue pixel side from the center position of the width in the second direction of the light shielding portion disposed at the boundary between the blue portion and the red portion,
the center position of the width in the second direction of the common electrode wiring disposed at the boundary between the red pixel and the green pixel is displaced to the red pixel side from the center position of the width in the second direction of the light shielding portion disposed at the boundary between the red portion and the green portion, and the center position of the width in the second direction of the data line disposed at the boundary between the red pixel and the green pixel is displaced to the green pixel side from the center position of the width in the second direction of the light shielding portion disposed at the boundary between the red portion and the green portion.

8. The liquid crystal display device according to claim 4, wherein the common electrode wiring disposed at the boundary between the blue pixel and the red pixel and the common electrode wiring disposed at the boundary between the red pixel and the green pixel blocks reflected light incident on the red portion, the reflected light including a red component caused by reflection of backlight from the plurality of data lines and the plurality of common electrode wirings.

9. The liquid crystal display device according to claim 4, further comprising an insulator covering the plurality of data lines,
wherein the common electrode is formed on the insulator, and
the plurality of common electrode wirings are formed on the common electrode.

10. The liquid crystal display device according to claim 3, wherein the first wiring is a common electrode wiring through which a common voltage is supplied to the common electrode, the second wiring is a gate line, and the third wiring is a data line.

11. The liquid crystal display device according to claim 3, wherein the first wiring is a gate line, the second wiring is a data line, and the third wiring is a common electrode wiring through which a common voltage is supplied to the common electrode.

12. A liquid crystal display device comprising:
a first substrate;
a second substrate disposed opposite to the first substrate; and
a liquid crystal layer sandwiched between the first substrate and the second substrate,
wherein the first substrate includes a plurality of first wirings extending in a first direction, a plurality of second wirings extending in a second direction different from the first direction, a plurality of third wirings that extend in the first direction and at least partially overlaps the first wiring, a plurality of pixel electrodes, a common electrode disposed opposite to the plurality of pixel electrodes, and a plurality of pixels disposed in the first direction and the second direction,
the second substrate includes a blue portion transmitting blue light, a red portion transmitting red light, a green portion transmitting green light, and a light shielding portion disposed at each boundary of the blue portion, the red portion, and the green portion to block the light transmission of each color,
the plurality of pixels include a blue pixel corresponding to the blue portion, a red pixel corresponding to the red portion, and a green pixel corresponding to the green portion,
the plurality of first wirings and the plurality of third wirings are made of a metallic material containing copper,
the plurality of third wirings are formed closer to the liquid crystal layer than the plurality of first wirings are,
a first interval is equal to a second interval, the first interval being an interval between the two first wirings adjacent to each other with the red pixel therebetween, and the second interval being an interval between the two first wirings adjacent to each other with the blue pixel therebetween, and a third interval is smaller than a fourth interval, the third interval being an interval between the two third wirings adjacent to each other with the red pixel therebetween, and the fourth interval being an interval between the two third wirings adjacent to each other with the blue pixel therebetween.

13. The liquid crystal display device according to claim 12, wherein the first wiring is a data line, the second wiring is a gate line, and the third wiring is a common electrode wiring through which a common voltage is supplied to the common electrode.

14. The liquid crystal display device according to claim 13, wherein the light shielding portions extending in the first direction are equally arranged at fifth intervals in the second direction.

15. The liquid crystal display device according to claim 14, wherein the fifth interval is equal to the first interval, and is larger than the third interval.

16. The liquid crystal display device according to claim 14, wherein the fifth interval is smaller than the first interval, and is equal to the third interval.

17. The liquid crystal display device according to claim 14, wherein the fifth interval is smaller than the first interval, and is larger than the third interval.

* * * * *